United States Patent
Nakamata et al.

(10) Patent No.: US 7,376,426 B2
(45) Date of Patent: May 20, 2008

(54) MEMORY MANAGEMENT IN MOBILE NETWORK

(75) Inventors: Masatoshi Nakamata, Kanagawa (JP); Benoist Sebire, Beijing (CN); Karri Ranta-Aho, Espoo (FI)

(73) Assignee: Nokia Corporation, Espoo (FI)

( * ) Notice: Subject to any disclaimer, the term of this patent is extended or adjusted under 35 U.S.C. 154(b) by 578 days.

(21) Appl. No.: 11/002,973

(22) Filed: Dec. 3, 2004

(65) Prior Publication Data

US 2006/0072496 A1    Apr. 6, 2006

(30) Foreign Application Priority Data

Sep. 29, 2004  (FI) .................... 20045364

(51) Int. Cl.
*H04Q 7/20*  (2006.01)
(52) U.S. Cl. .............. 455/442; 370/331; 714/748; 714/749
(58) Field of Classification Search ........ 455/436–444; 370/331; 714/748–749
See application file for complete search history.

(56) References Cited

U.S. PATENT DOCUMENTS

2003/0118043 A1  6/2003  Sebire et al.
2004/0141515 A1  7/2004  Xiao
2004/0192308 A1*  9/2004  Lee et al. .................. 455/436

FOREIGN PATENT DOCUMENTS

GB    2401748 A    11/2004

OTHER PUBLICATIONS

Massimo Bertinelli et al. "HARQ for WCDMA enhanced uplink: link level performance in SHO.", In: International Symposium on Personal, Indoor and Mobile Radio Communications 2004, PIMRC 2004, 15th IEEE, Sep. 5-8, 2004, vol. 4, pp. 2856-2860. Chapter II.

* cited by examiner

*Primary Examiner*—Edward F. Urban
*Assistant Examiner*—Raymond S. Dean
(74) *Attorney, Agent, or Firm*—Squire, Sanders & Dempsey, L.L.P.

(57) ABSTRACT

A radio network element, including means for receiving data packets from a user equipment in a soft handover connection, means for determining whether the received data blocks have been received successfully or unsuccessfully, means for running a retransmission process for an unsuccessfully received data packet, and means for receiving control information instructing the size of memory to be reserved for retransmission processes of the connection.

37 Claims, 6 Drawing Sheets

MEMORY MANAGEMENT IN MOBILE NETWORK

FIELD

The invention relates to a radio network, a radio network element, a software product and a method for memory allocation in a radio network. More particularly, the invention relates to memory allocation in conjunction with data packet retransmission during a soft handover.

BACKGROUND

In mobile networks, data packet transmission is often utilized for conveying non-real time data. In non-real time data transfer, retransmission of individual data packets is possible in case a data packet is not received successfully.

A soft handover in a mobile network is a situation, where a mobile can simultaneously have a connection with several base stations. The soft handover, however, poses problems for management of memory that is reserved for handling retransmissions in the individual base stations. As a result, soft combining possibilities will vary across the Node Bs in the soft handover set.

Without effective memory management, overflow and waste of memory resources in base stations during soft handover might occur.

SUMMARY

An object of the invention is to provide an improved method, mobile terminal, a radio network, a radio network element and a computer program product.

In one aspect of the invention there is provided a radio network, including a set of network elements providing an uplink packet data soft handover connection to a user equipment, wherein each network element belonging to the set of network elements includes means for determining whether a received data packet has been received successfully or unsuccessfully, means for running a retransmission process for an unsuccessfully received data packet, wherein the radio network includes means for controlling that the network elements in the set of network elements allocate an equal size of memory for storage of retransmission processes of the connection.

In another aspect of the invention there is provided a radio network element, including means for receiving data packets from a user equipment in a soft handover connection, means for determining whether the received data packets have been received successfully or unsuccessfully, means for running a retransmission process for an unsuccessfully received data packet, means for receiving control information instructing the size of memory to be reserved for retransmission processes of the connection.

In still another aspect of the invention there is provided a method of controlling memory in a radio system, the method including communicating data packets in uplink between a user equipment and a set of network elements in a soft handover, running a retransmission process for an unsuccessfully received data packet, the retransmission process requiring a predetermined size of memory, wherein allocating, in each of the network elements of the set of network elements, an equal size of memory for storing retransmission processes.

In still another aspect of the invention there is provided a computer program product encoding a computer program of instructions for executing a computer process for controlling memory in a radio network, the process including communicating data packets in uplink between a user equipment and a set of network elements in a soft handover, running a retransmission process for an unsuccessfully received data packet, the retransmission process requiring a predetermined size of memory, wherein allocating an equal size of memory to each network element of the set of network elements for storing retransmission processes.

In still another aspect of the invention there is provided a computer program product encoding a computer program of instructions for executing a computer process for controlling memory in a radio network element, the process including communicating data packets in uplink between a user equipment and the network element in a soft handover, running a retransmission process for an unsuccessfully received data packet, the retransmission process requiring a predetermined size of memory, wherein receiving control information indicating a size of memory to be reserved for storing retransmission processes, the size of memory being equal to size of memory allocated to other network elements in the set of network elements participating in the soft handover.

In still another aspect of the invention there is provided a mobile terminal, including means for communicating with network elements belonging to a set of network elements in a soft handover using packet data transmission, means for receiving acknowledgements from network elements of the set of network elements indicating whether data packets were received successfully or unsuccessfully, means for running a retransmission process for an unsuccessfully communicated data packet, wherein the retransmission process running means is configured to run retransmission processes with the network elements of the set of network elements, the memory sizes of the network elements for storing retransmission processes being aligned with each other.

The invention concerns packet data transmission in a mobile network. In one embodiment, the network is a UMTS (Universal Mobile Telecommunications System) network applying WCDMA (Wideband Code Division Multiple Access) technology. The invention is not, however, restricted to application in UMTS but can be applied to other mobile networks as well.

In one embodiment, the invention is applied to a network that supports High Speed Uplink Packet Access (HSUPA), which is a packet-based data service in a WCDMA (Wideband Code Division Multiple Access) network. The network according to the invention can support HSUPA protocol elements, such as HARQ (Hybrid Automatic Retransmission Request) and AMC (Adaptive Modulation and Coding). An uplink data transfer mechanism in the HSUPA can be provided by physical HSUPA channels, such as an E-DPDCH (Enhanced Dedicated Physical Data Channel), implemented on top of WCDMA uplink physical data channels such as a DPCCH (Dedicated Physical Control Channel) and a DPDCH (Dedicated Physical Data Channel).

The invention relates to memory allocation in the network in conjunction with a soft handover procedure. The memory reallocation may be needed when a change occurs in the active set, that is, deletion or addition of a soft handover branch. Soft handover refers to a handover, which occurs between different base stations and where the radio links are added and abandoned in such a manner that the user equipment always keeps at least one radio link to the radio access network (RAN). Thus, the set of network elements participating in the soft handover includes at least one network element.

The memory allocation according to the invention relates to uplink transmission from user equipment towards the network infrastructure.

According to the invention, network elements participating in handover, such as Node Bs or base stations, are coordinated with respect to memory allocation that is needed for data packet retransmissions. Network elements participating in handover are such network elements that are part of the active set and/or base stations that are about to be included in the active set.

As an advantage, the invention provides an effective solution for optimizing memory allocation in a mobile network.

LIST OF DRAWINGS

In the following, the invention will be described in greater detail with reference to the embodiments and the accompanying drawings, in which FIG. 1 shows a first example of a wireless telecommunications system;

DESCRIPTION OF EMBODIMENTS

Figure 1:
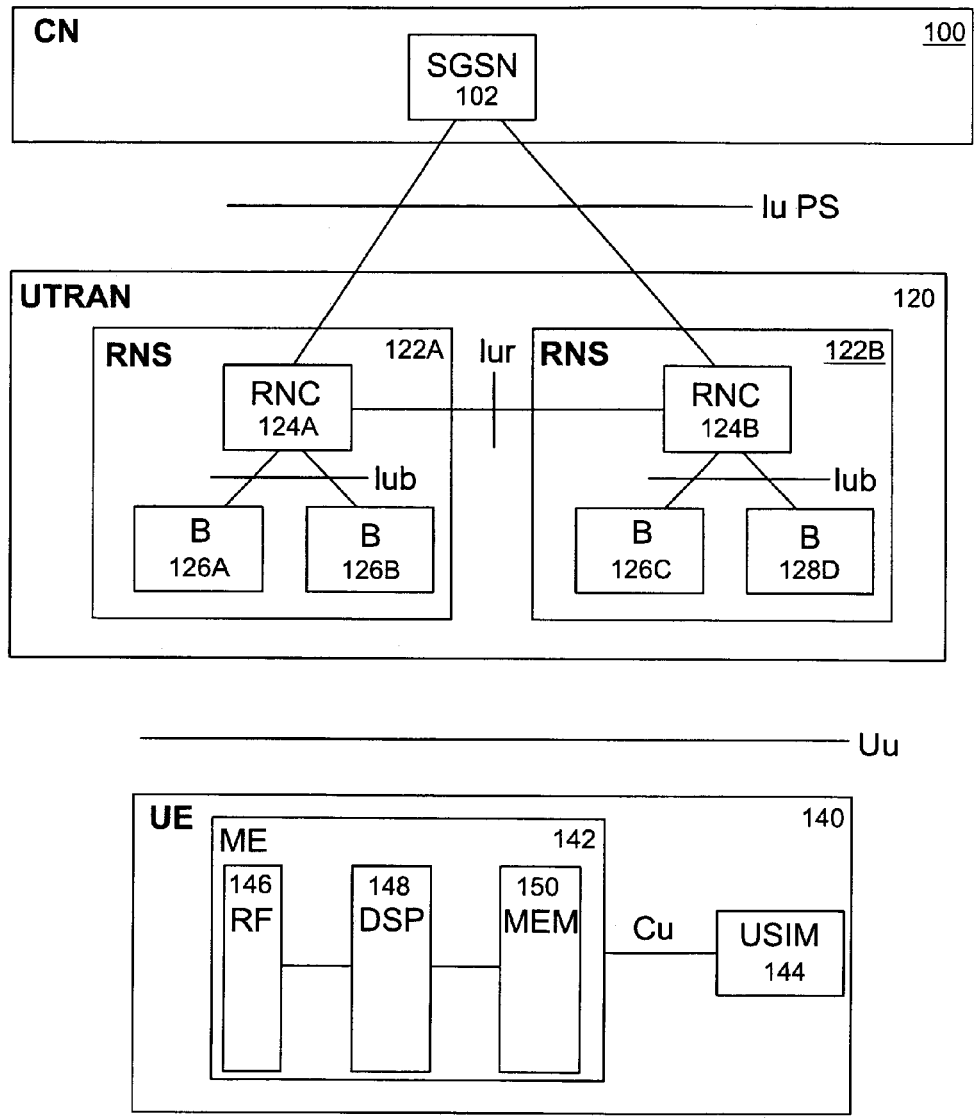

FIG. 1 illustrates an example of a wireless telecommunications system to which the present solution may be applied. Below, embodiments of the invention will be described using the UMTS (Universal Mobile Telecommunications System) as an example of the wireless telecommunications system. The invention may, however, be applied to any wireless telecommunications system that supports data packet transmission and soft handover functionality. The invention can be applied in a radio network that supports HSUPA protocol elements, such as HARQ (Hybrid Automatic Retransmission Request) and fast node B controlled uplink scheduling. The structure and the functions of such a wireless telecommunications system and those of the associated network elements are only described when relevant to the invention.

The wireless telecommunications system may be divided into a core network (CN) 100, a UMTS terrestrial radio access network (UTRAN) 120, and user equipment (UE) 140. The core network 100 and the UTRAN 120 are part of a network infrastructure of the wireless telecommunications system. The UTRAN 120 is typically implemented by wideband code division multiple access (WCDMA) radio access technology.

The core network 100 includes a serving GPRS support node (SGSN) 102 connected to the UTRAN 102 over an Iu PS -interface. The SGSN 102 represents the center point of the packet-switched domain of the core network 100. The main task of the SGSN 102 is to transmit packets to the user equipment 140 and to receive packets from the user equipment 140 by using the UTRAN 120. The SGSN 102 may contain subscriber and location information related to the user equipment 140.

The UTRAN 120 includes radio network sub-systems (RNS) 122A and 122B, each of which includes at least one radio network controller (RNC) 124A, 124B and node Bs 126A, 126B, 126C, 126D.

Some functions of the radio network controller 124A, 124B may be implemented with a digital signal processor, memory, and computer programs for executing computer processes. The basic structure and the functionality of the radio network controller 124A, 124B is known to one skilled in the art and only the details relevant to the present solution are discussed in detail.

The node Bs 126A, 126B, 126C, 126D implement the Uu-interface, through which the user equipment 140 may access the network infrastructure.

Some functions of the base stations 126A, 126B, 126C, 126D may be implemented with a digital signal processor, memory, and computer programs for executing computer processes. The basic structure and operation of the base station 126A, 126B, 126C, 126D are known to one skilled in the art and only the details relevant to the present solution are discussed in detail.

The user equipment 140 may include two parts: mobile equipment (ME) 142 and a UMTS subscriber identity module (USIM) 144. The mobile equipment 142 typically includes radio frequency parts (RF) 146 for providing the Uu-interface. The user equipment 140 further includes a digital signal processor 148, memory 150, and computer programs for executing computer processes. The user equipment 140 may further comprise an antenna, a user interface, and a battery not shown in FIG. 1. The USIM 144 comprises user-related information and information related to information security in particular, for instance an encryption algorithm.

Figure 2:
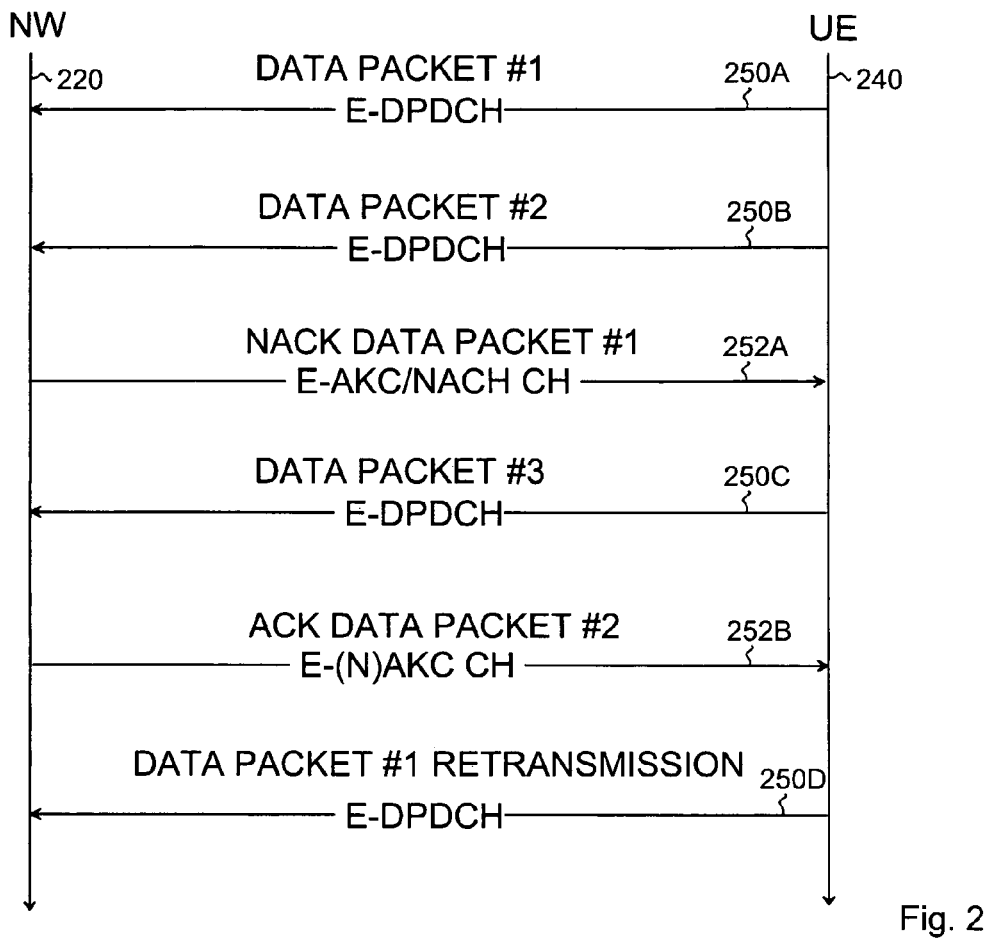
FIG. 2 shows an example of data packet retransmission.

FIG. 2 illustrates an example of data packet transmission between a network (NW) 220 and user equipment (UE) 240. An uplink control channel, such as an uplink DPCCH (Dedicated Physical Control Channel) defined in the 3GPP ($3^{rd}$ Generation Partnership Project) specification, transmitted by the user equipment 240, includes pilot sequences. The network 220 encodes the pilot sequences and estimates signal quality parameters, such as SIR (Signal-to-Interference Ratio), of the uplink DPCCH.

The user equipment 240 may be connected to the network infrastructure 220 over an uplink physical data channel, such as a DPDCH (Dedicated Physical Data channel) defined in the 3GPP specification. The uplink physical data channel represents a conventional data channel that as such excludes the use of the HSUPA protocol. High data rate packet services in the uplink can be provided by a physical HSUPA channel, such as an E-DPDCH (Enhanced Dedicated Physical Data Channel) defined in the 3GPP specification. The E-DPDCH transfers data packets at predetermined intervals, such as a TTI (Transmission Time Interval). Each data packet is received, and a CRC (Cyclic Redundancy Check) procedure, for example, is used to test the success of the reception of the packet.

An acknowledgement message is generated for each data packet on the basis of the test. If the data block was received successfully, the block acknowledgement message indicates "acknowledgement (ACK)". If the data block was received unsuccessfully, the block acknowledgement message indicates "non-acknowledgement (NACK)". The block acknowledgement message is transmitted from the infrastructure 220 over an HSUPA acknowledgement message channel referred to as E-(N)ACK channel within this application.

FIG. 2 shows one example of data packet transmission, wherein data packets #1, #2 and #3 are transmitted from the UE to NW in respective signals 250A, 250B and 250C. Data packet #1 is received unsuccessfully in the NW and therefore a NACK 252A is generated. The unsuccessfully received data packet #1 is retransmitted in signal 250D.

Figure 3:
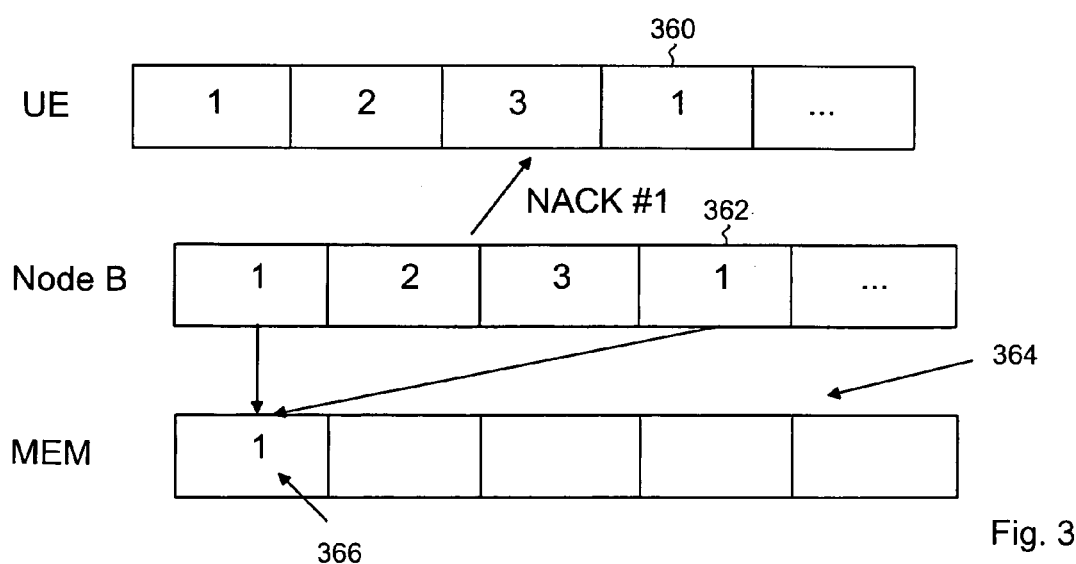
FIG. 3 illustrates an example of data packet transmission and storage.

FIG. 3 illustrates the memory management in a base station (Node B) belonging to an active set of a handover. The data block 360 shows the data packets transmitted from a UE, that is, data packets are transmitted in order 1-2-3-1 as illustrated in FIG. 2. The Node B receives the data packets somewhat shifted in time shown by block 362. Since data packet #1 was unsuccessfully received, the generated NACK #1 is also shown.

The Node B reserves a certain amount of memory 364 for the retransmission processes of data packets. In FIG. 3, there are 5 memory elements reserved for retransmission processes, each element capable of storing one retransmission process. The memory element 366 in FIG. 3 illustrates soft combining of two instances of reception of data packet #1. When the soft-combined sum indicates that reception of packet #1 is successful, data storage element can be emptied and used for storing of another retransmission process.

Figure 4:
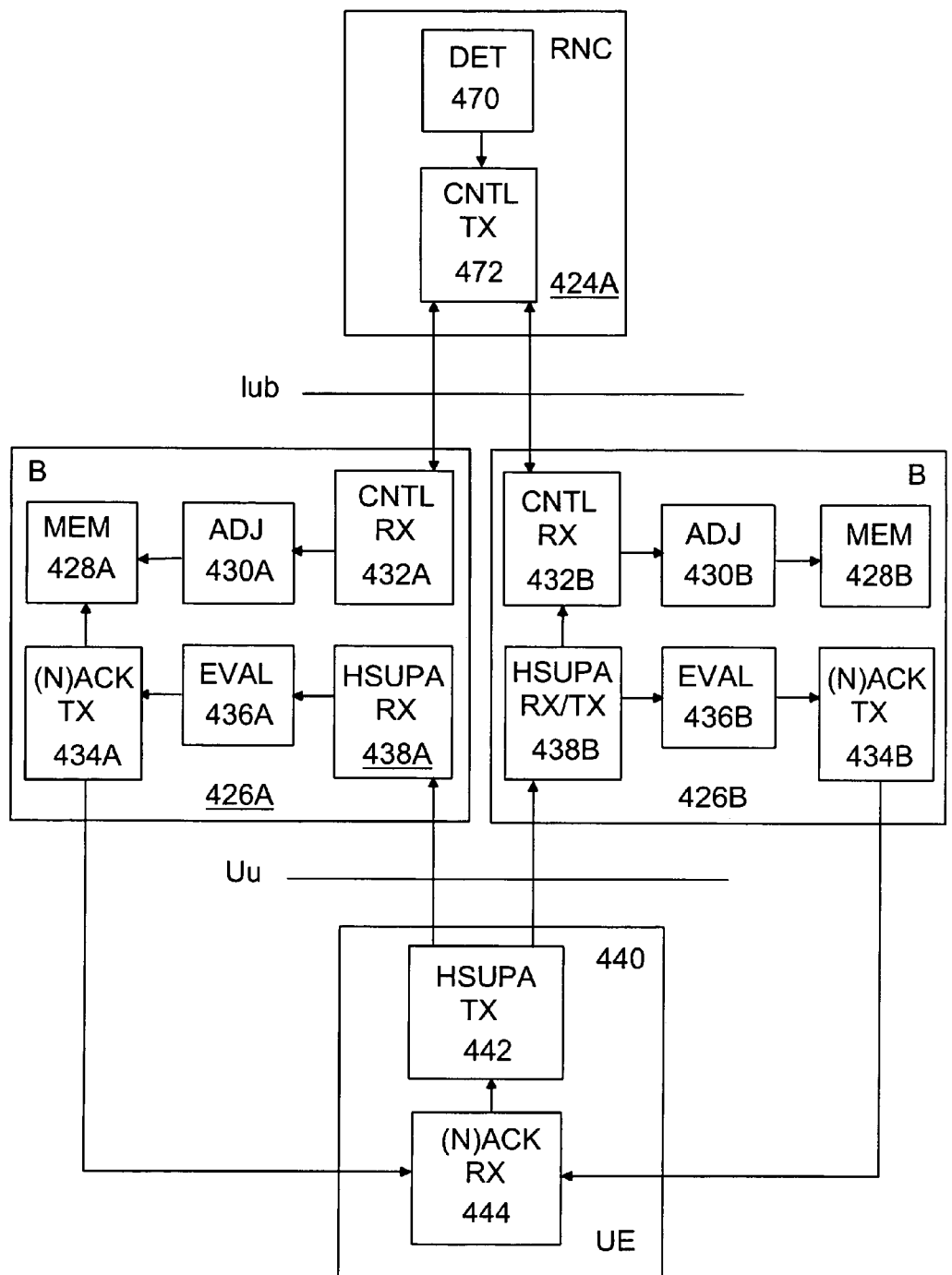
FIG. 4 shows an example of apparatus according to the invention.

FIG. 4 illustrates one embodiment of the arrangement according to the invention. Only functionality that relates to the invention is shown in FIG. 4.

The illustrated radio network includes a radio network controller 424A controlling two Node Bs 426A and 426B that are having a soft handover connection with user equipment 440. The radio network controller 424A operates with Node Bs over an Iub-interface and the Node Bs operate towards the UE over an Uu-interface.

The illustrated Node Bs 426A and 426B include similar functionality and therefore functionality included in Node B 426A is only explained. Node B 426A includes means for receiving uplink transmission 438A. The uplink transmission can be HSUPA transmission, for instance. The data packets that are received in the uplink transmission are evaluated in the evaluating means 436A. The evaluating means 436A can assess the acceptability of a data packet by evaluating some generally known packet data quality measure such as the cyclic redundancy check (CRC) that is part of the data decoding process.

Upon the acceptability evaluation, the acknowledgement generating means 434A generates an ACK/NACK regarding the data packet. Not acceptable data packets can be stored in the storing means 428A. If the not accepted data packet is a first instance of the data packet in question, it is checked whether the storing means has a storage position available. If a storage position is available, the first instance of the data packet is stored into the available storage position. If the not accepted data packet is a first instance of the data packet and there is no storage position available, the data packet cannot be stored and the soft-combining gain for that process is lost.

If the not accepted data packet is a second or subsequent instance of a particular data packet and the data packet has already a reserved storage position in the memory, the second or subsequent instance of the data packet is soft-combined with the data in the memory.

The Node B 426A also includes control information receiving means 432A. The control information that is received from a radio network controller 424A can be the size of the memory that shall be reserved for the retransmission processes. For example, the control information can tell the Node B the number of retransmission processes that shall be stored for a connection. Instead of giving the absolute size of the memory, the control information can also include information that tells how much the Node B shall increase/decrease its memory size. The control information can also include information such as data rate of the UE, out of which information the Node B can extract the size of the memory used. The control information determining the memory size allocated for the HARQ processes can be signaled at setup of the E-DCH channel, for instance.

The node B further includes memory adjusting means 430A that is capable of adjusting the size of the memory upon the received control information. The adjusting means 430A can adjust the memory size to the memory size of the Node B having the greatest or smallest memory size in the SHO set. The memory size can also be adjusted to the memory size of the scheduling Node B or the maximum memory size need can be determined on the basis of the maximum data transfer capacity allowed for the UE by the network infrastructure.

The storing means 428A can be capable of reserving memory capacity that is a multiple of the size of one data packet, for instance.

The radio network controller 424A can include determining means 470 for determining the memory size that is suitable for the connection. For instance, the determining means can get the memory size from the data rate of the user. In another embodiment, when a network element, such as a base station or Node B leaves an SHO set, the determining means can check if the leaving BTS had the smallest memory size. If that was the case, the determining means determines the node B that has the second smallest memory size. In another embodiment, if a new base station is to be added to the SHO set, the determining means can check if the new base station has a greater memory size than the base stations in the active set and if this is the case, convey this information via control information transmitting means 472 to the Node Bs.

The arrangement according to FIG. 4 also contains UE 440 including data packet transmission means 442 and acknowledgement receiving means 444.

The equipment and apparatus units shown in FIG. 4 can be implemented by software for instance. Alternatively, the functionality can be implemented by ASIC (Application Specific Integrated Circuit) or FPGA (Field Programmable Gate Array).

Figure 5:
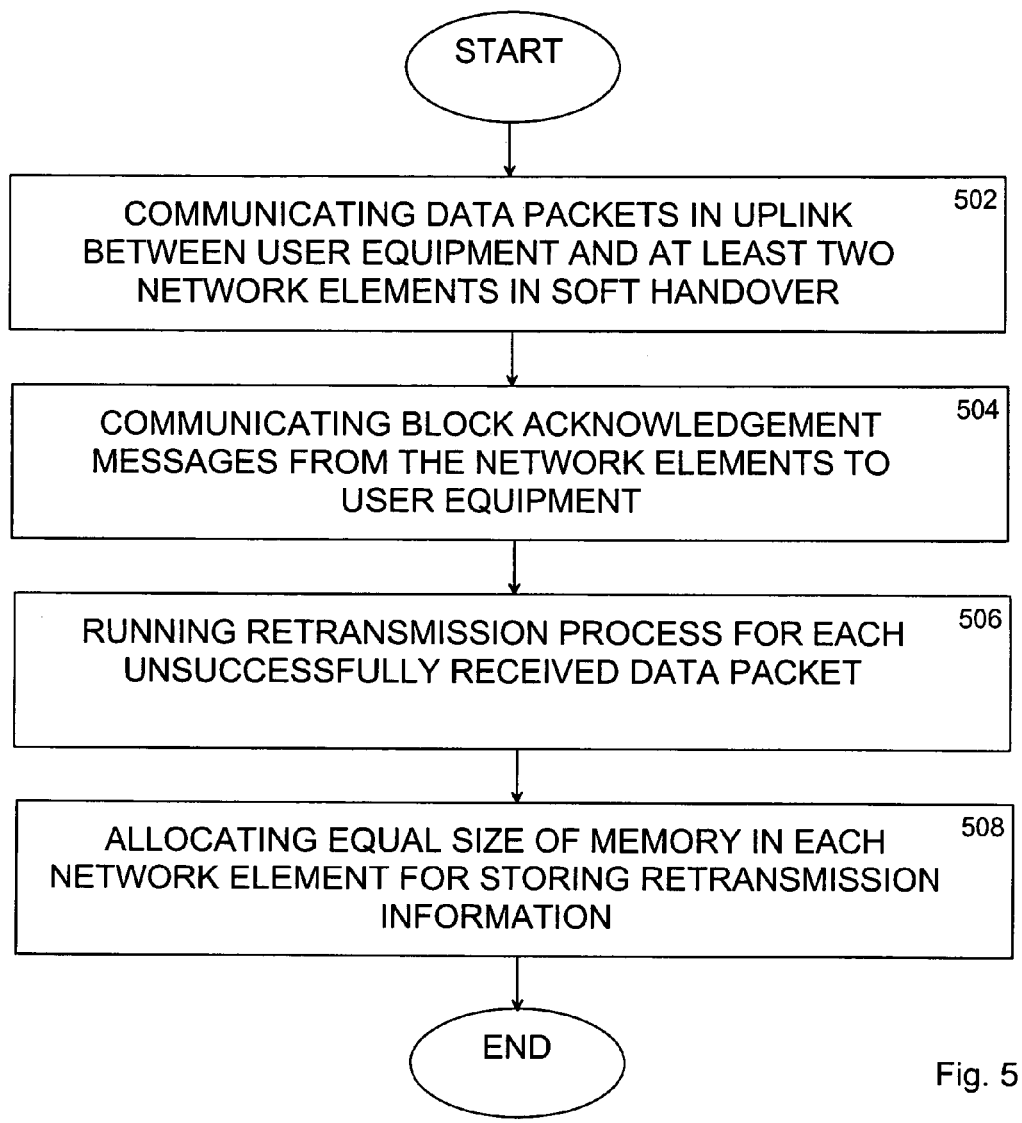
FIG. 5 illustrates a first example of a method according to the invention.

FIG. 5 illustrates one embodiment of the method according to the invention. In phase 502 of FIG. 5, data packets are communicated in uplink soft handover connection between user equipment and a network infrastructure. The data connection in method of FIG. 5 is a soft handover connection, wherein user equipment has a simultaneous connection to at least two base stations of the network.

In phase 504, data packets that are received by the network element are acknowledged to the user equipment. The acknowledgement indicates whether a data packet was received successfully or not.

Method phase 506 illustrates how a retransmission process is run for each unsuccessfully received data packet. The retransmission process here means that the network element has acknowledged a data packet as unsuccessful, after which the user equipment retransmits the data packet. The receiver of the network element then soft-combines the previously stored information with the newly received information. In one embodiment of the invention, the retransmission protocol is HARQ.

In method phase 508, it is controlled that equal size of memory is allocated to each network element that participates, or is about to participate in the soft handover.

Figure 6:
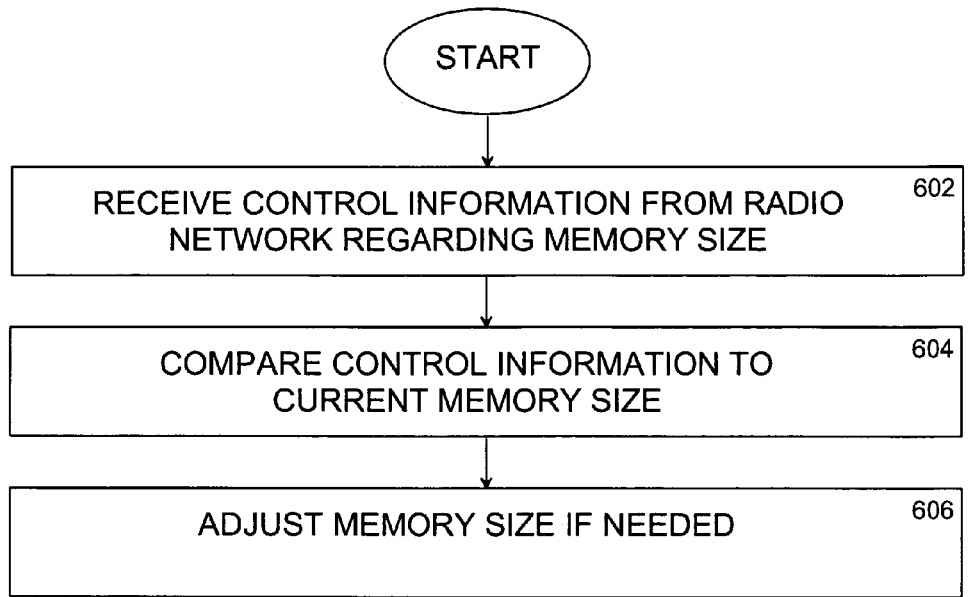
FIG. 6 illustrates a second example of a method according to the invention.

FIG. 6 shows one embodiment of the method executed in a radio network element, such as base station. In 602, the base station receives control information from a radio network controller. The control information can indicate the memory size to be used as an absolute value. Alternatively, the control information can indicate whether the memory size shall be increased or decreased. In 604, the memory size given in the control information is compared to the memory size currently used in the base station. If the two values differ from each other, the size of the memory can be adjusted as shown in phase 606.

If the size of memory in a Node B is smaller than the memory required to support all HARQ processes, an overflow is possible. In one embodiment, the Node B can support as many HARQ processes as possible and leave the remaining ones. That is, if n HARQ processes are defined and the available memory in the Node B only allows m processes to be supported (with m<n), n-m processes are not supported (n−m≧1). In other words, if the Node B has enough memory to perform soft combining for m HARQ processes only, soft combining cannot be performed for the remaining n-m HARQ processes. The m HARQ processes to be supported can be any of the n: {1,2, . . . ,n}. In one embodiment, the Node B supports the m first HARQ processes: {1,2, . . . ,m}. For instance, if four HARQ processes are defined, and the Node B's memory only allows two HARQ processes to be soft combined, only the HARQ processes number 1 (first one) and number 2 (second one) are soft combined in the Node B. But even though the Node B cannot perform soft combining for n-m HARQ processes, it can still decode and acknowledge each of the n HARQ processes depending on the retransmission policy.

If self-decodable redundancy versions are used, that is, each retransmission can be decoded without using the values of previous retransmission(s)), the Node B can decode and acknowledge the n-m HARQ processes as well.

If non-self-decodable redundancy versions are used, that is, the decoding of a retransmission requires the knowledge of the first transmission, the Node B can only acknowledge the first transmission of the n-m HARQ processes, it cannot store the following retransmission(s)—if any. However, NACK signaling for those processes that are not stored, may have to be sent anyway.

Thus, in the previous example this means that although the Node B has enough memory to support two HARQ processes only, it can still send ACK/NACK signaling for all the four processes.

If self-decodable redundancy versions are used, ACK/NACK signaling can be sent for all four HARQ processes but soft combining is only performed for HARQ processes number 1 and 2.

If non-self-decodable redundancy versions are used, ACK/NACK signaling can only be sent for the first transmission of HARQ processes number 3 and 4. NACK-signaling may have to be sent also for successive instances of processes 3 and 4, depending on the implementation of the acknowledgement channel.

Conversely, when the memory of a Node B is larger than the memory required to support all HARQ processes, a waste of resource is possible. When this occurs, the Node B can either reallocate the remaining memory to something else or leave the situation as it is, that is, accept the waste of resources.

Figure 7:
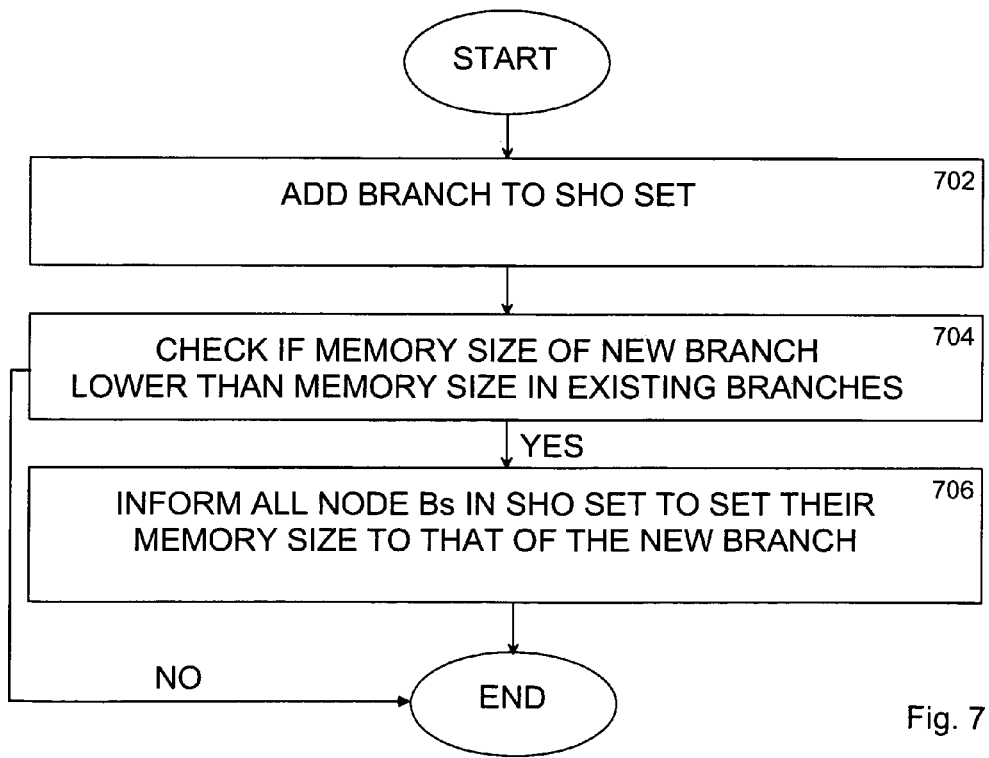
FIG. 7 illustrates still another example of a method according to the invention.

FIG. 7 shows one embodiment of the method that can be executed in the radio network controller or a corresponding network element. In 702, a new branch, that is, a new network element, is added to the set of network elements. In 704, it is checked whether the memory size of the new branch is smaller than the memory sizes in existing branches. If that is the case, the memory size of the new branch being smaller than in any of the existing branches, is transmitted to the existing branches.

Figure 8:
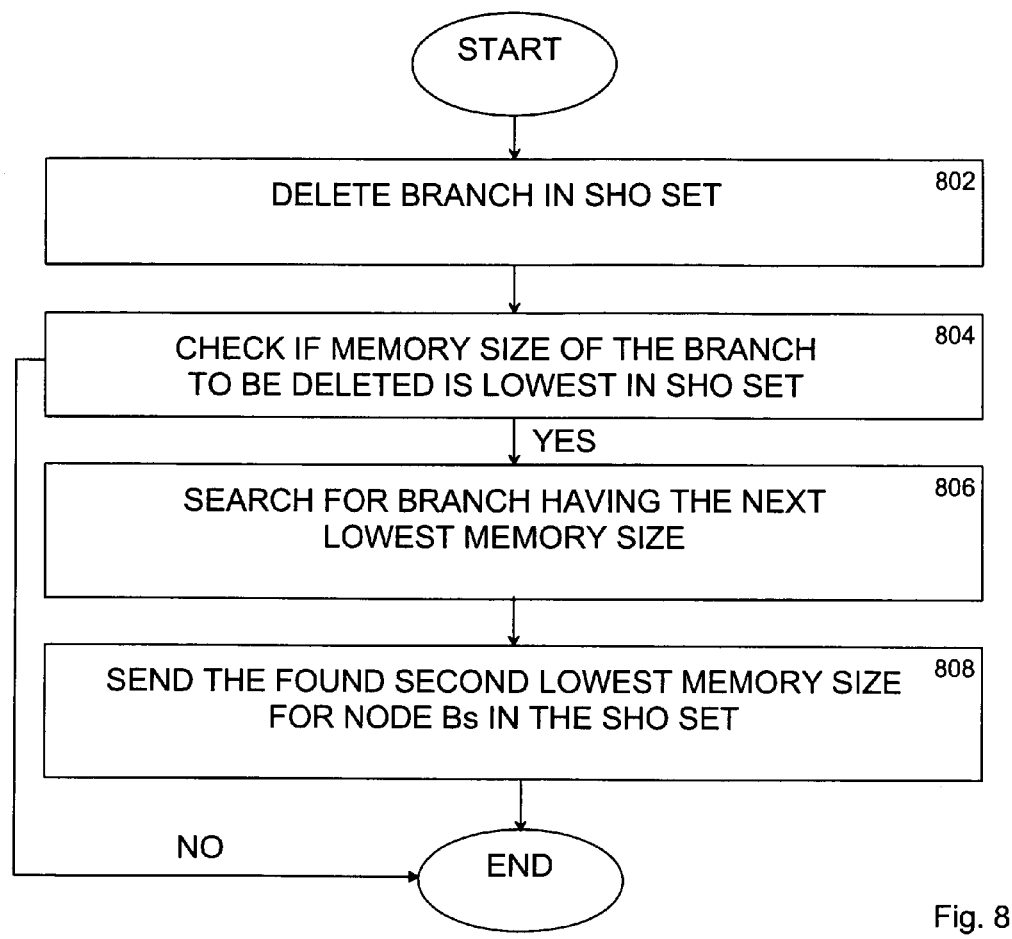
FIG. 8 illustrates still another example of a method according to the invention.

FIG. 8 shows another embodiment of the method according to the invention. In 802, a base station is about to leave the soft handover. In phase 804 it is checked whether the base station leaving the soft handover had the smallest memory size in the set of base stations participating in the soft handover. If yes, more memory could be allocated to the user in the existing soft handover base stations. Thus, the network determines 806 the base station that has the smallest memory size in the new active set when the base station having the smallest memory size is removed from the active set. Finally, in phase 808 information on the smallest memory size in the new active set is transmitted to the remaining base stations of the active set.

In one aspect of the invention, there is provided a software product to accomplish tasks disclosed in conjunction with embodiments of the method of the invention.

Even though the invention has been disclosed above with reference to an example according to the accompanying drawings, it is clear that the invention is not restricted thereto but can be modified in several ways within the scope of the appended claims.

The invention claimed is:

1. A radio network, comprising:
   a set of network elements providing an uplink packet data soft handover connection to a user equipment, wherein each network element in the set of network elements comprises
   a determining unit configured to determine whether a received data packet has been received successfully or unsuccessfully, and
   a running unit configured to run a retransmission process for the unsuccessfully received data packet; and
   an adjusting unit configured to adjust a size of memory for storage of retransmission processes of at least one network element in the set of network elements such that the network elements in the set of network elements allocate an equal size of memory for storage of retransmission processes of the soft handover connection.

2. The radio network of claim 1, wherein the running unit is configured to soft-combine at least two instances of the data packet.

3. The radio network of claim 1, wherein the controlling unit is configured to control memory sizes of the network elements when a change occurs in the set of network elements providing the soft handover connection.

4. The radio network of claim 1, wherein the controlling unit is configured to
   check, when a new network element is to be added to the set of network elements providing the soft handover connection, if a memory size in the new network element is smaller than memory sizes of other network elements of the set of network elements, and
   send control information to the network elements in the set of the network elements, the control information indicating the memory size of the new network element to be added to the set of network elements providing the soft handover connection.

5. The radio network of claim 1, wherein the controlling unit is configured to
check, when a new network element is to be removed from the set of network elements providing the soft handover connection, if a memory size in the network element to be removed is smallest in the set of network elements,
determine, if the memory size of the network element to be removed is smallest, one of the remaining network elements having a second smallest memory size, and
send control information to the network elements remaining in the set of network elements, the control information indicating the second smallest memory size.

6. The radio network of claim 1, wherein the controlling unit is configured to
determine a memory size of a network element of the set of network elements having the smallest memory size, and
send control information to the network elements in the set of the network elements, the control information indicating the determined smallest memory size.

7. The radio network of claim 1, wherein each network element is configured to
receive control information, and
discard at least one retransmission process if a memory size indicated in the control information exceeds the memory size applied in a network element of the set of network elements.

8. The radio network of claim 7, wherein the network element is configured to
transmit positive or negative acknowledgement signaling depending on whether the data packet has been received successfully or unsuccessfully and regarding data packets discarded in the network element.

9. The radio network of claim 1, wherein the controlling unit is configured to
determine a memory size of the network element in the set of network elements having a greatest memory size, and
control that all the network elements in the set of network elements are aware of the determined greatest memory size.

10. The radio network of claim 8, wherein a network element belonging to the set of network elements comprises
a receiving unit configured to receive the control information giving a greatest memory size, and
adjusting unit configured to adjust a memory capacity to the greatest memory capacity.

11. The radio network of claim 1, wherein the controlling unit is configured to
determine a memory size of a packet data scheduling network element, and
send control information to the network elements other than the scheduling network element, the control information indicating the memory size of the scheduling network element.

12. The radio network of claim 1, wherein the controlling unit is configured to
determine the memory sizes of the network elements providing the soft handover connection, and
control a data rate of the soft handover connection such that the memory sizes of the network elements are not exceeded.

13. A radio network element, comprising:
a receiving unit configured to receive data packets from a user equipment in a soft handover connection;
a determining unit configured to determine whether the received data packets have been received successfully or unsuccessfully;
a running unit configured to run a retransmission process for an unsuccessfully received data packet;
an information receiving unit configured to receive control information instructing a size of a memory to be reserved for retransmission processes of the soft handover connection; and
an adjusting unit configured to adjust a size of memory for storage of retransmission processes of at least one network element in a set of network elements such that the network elements in the set of network elements allocate an equal size of memory for storage of retransmission processes of the soft handover connection.

14. The radio network element of claim 13, wherein the running unit is configured to soft-combine in the memory at least two instances of a data packet.

15. The radio network element of claim 13, wherein the receiving unit is configured to receive memory size information when a change occur in a set of network elements providing the soft handover connection.

16. The radio network element of claim 13, wherein the information receiving unit is configured to receive the control information indicating a memory size of a new network element to be added to a set of network elements providing the soft handover connection if the memory size in the new network element is smaller than memory sizes of the network elements of the set of the network elements.

17. The radio network element of claim 13, wherein the controlling unit is configured to receive the control information indicating a memory size of a network element having a second smallest memory size in a set of network elements providing the soft handover connection, when the network element having a smallest memory size is about to be removed from the set of network elements.

18. The radio network element of claim 13, further comprising:
an adjusting unit configured to adjust the size of the memory according to the received control information.

19. The radio network element of claim 13, wherein the information receiving unit is configured to receive a memory size of a network element having a smallest memory size in a set of network elements providing the soft handover connection.

20. The radio network element of claim 13, wherein the information receiving unit is configured to receive a memory size of a network element having a greatest memory size in a set of network elements providing the soft handover connection.

21. The radio network element of claim 13, wherein the information receiving unit is configured to receive as the control information a memory size of a scheduling network element.

22. The radio network element of claim 13, wherein the information receiving unit is configured to receive as the control information a memory size that is determined by controlling a data rate of the soft handover connection such that memory sizes of the network elements providing the soft handover are not exceeded.

23. The radio network element of claim 13, wherein the radio network element is configured to discard at least one of the retransmission processes if a memory size received in the control information for storing of the retransmission processes exceeds the memory size applied in a network element.

24. The radio network element of claim 23, wherein the running unit is configured to transmit acknowledgement signaling regarding the data packets that are discarded in the network element.

25. The radio network element of claim 13, wherein the running unit is configured to transmit a positive acknowledgement as a response to a successfully received first instance of a data packet of the data packets.

26. The radio network element of claim 13, wherein the running unit is configured to transmit a negative acknowledgement as a response to a unsuccessfully received first instance of a data packet of the data packets.

27. The radio network element of claim 13, wherein the running unit is configured to transmit a negative acknowledgement as a response to a non-self-decodable data packet being other than a first instance of a data packet of the data packets irrespective of whether the data packet has been received successfully or unsuccessfully.

28. The radio network element of claim 27, wherein the running unit is configured to discard unsuccessfully received, other than a first instance, of non-self-decodable data packets even if there is memory available.

29. The radio network element of claim 13, wherein the running unit is configured to transmit a positive acknowledgement as a response to any successfully received self-decodable data packet.

30. The radio network element of claim 13, wherein the running unit is configured to
transmit a negative acknowledgement as a response to an unsuccessfully received self-decodable data packet, and
discard the data packet of the data packets if there is no memory available.

31. The radio network element of claim 13, wherein the radio network element belongs to a high speed uplink packet access system.

32. The radio network element of claim 13, further comprising:
a communicating unit configured to communicate block acknowledgement messages from a network towards the user equipment, each block acknowledgement message indicating whether or not a data block is received successfully.

33. The radio network element of claim 32, wherein each unsuccessfully received data block starts a new retransmission process.

34. A method of controlling a memory in a radio system, the method comprising:
communicating data packets in uplink between a user equipment and a set of network elements providing a soft handover connection;
running a retransmission process for an unsuccessfully received data packet, the retransmission process requiring a predetermined size of the memory;
adjusting a size of memory for storage of retransmission processes of at least one of the network elements in the set of the network elements; and
allocating, in each of the network elements of the set of network elements, an equal size of the memory for storing retransmission processes.

35. A computer program embodied on a computer-readable medium comprising program code configured to control a processor to execute a process for controlling a memory in a radio network, the process comprising:
communicating data packets in uplink between a user equipment and a set of network elements providing a soft handover connection;
running a retransmission process for an unsuccessfully received data packet, the retransmission process requiring a predetermined size of the memory;
adjusting a size of memory for storage of retransmission processes of at least one of the network elements in the set of the network elements; and
allocating an equal size of the memory to each network element of the set of network elements for storing retransmission processes of the soft handover connection.

36. A computer program embodied on a computer-readable medium comprising program code configured to control a processor to execute a process for controlling a memory in a radio network, the process comprising:
communicating data packets in an uplink between a user equipment and a network element in a soft handover connection;
running a retransmission process for an unsuccessfully received data packet, the retransmission process requiring a predetermined size of the memory; and
adjusting a size of memory for storage of retransmission processes of at least one network element in a set of network elements; and
receiving control information indicating a size of the memory to be reserved for storing retransmission processes, the size of the memory being equal to the size of the memory allocated to other network elements in a set of network elements providing the soft handover connection.

37. A mobile terminal, comprising:
a communicating unit configured to communicate with network elements belonging to a set of network elements providing a soft handover connection using packet data transmission;
a receiving unit configured to receive acknowledgements from the network elements of the set of network elements indicating whether data packets are received successfully or unsuccessfully;
a running unit configured to run a retransmission process for an unsuccessfully communicated data packet; and
an adjusting unit configured to adjust a size of memory for storage of retransmission processes of at least one of the network elements in the set of the network elements,
wherein the running unit is configured to run retransmission processes with the network elements of the set of network elements, memory sizes of the network elements for storing the retransmission processes being equal to each other.

* * * * *